US008392242B1

(12) United States Patent
Utter et al.

(10) Patent No.: US 8,392,242 B1
(45) Date of Patent: Mar. 5, 2013

(54) COMPUTER-IMPLEMENTED METHODS FOR COMPENSATING ENTITIES THAT COOPERATIVELY PROVIDE ACCESS TO CONTENT ON WEB SITES

(75) Inventors: Brian J. Utter, Seattle, WA (US); Sarah S. Bryar, Seattle, WA (US); Anil K. Dedhia, Bellevue, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2254 days.

(21) Appl. No.: 11/231,620

(22) Filed: Sep. 21, 2005

(51) Int. Cl.
*G06Q 30/00* (2012.01)
*G07G 1/14* (2006.01)

(52) U.S. Cl. ............................................. 705/14
(58) Field of Classification Search ............... 705/14
See application file for complete search history.

(56) References Cited

U.S. PATENT DOCUMENTS

| | | | |
|---|---|---|---|
| 5,794,210 A | 8/1998 | Goldhaber et al. | |
| 6,029,141 A * | 2/2000 | Bezos et al. | 705/27 |
| 7,124,115 B1 | 10/2006 | Herzberg et al. | |
| 7,249,060 B2 * | 7/2007 | Ling | 705/26 |
| 2002/0120567 A1 * | 8/2002 | Caplan et al. | 705/40 |
| 2003/0149938 A1 | 8/2003 | McElfresh et al. | |
| 2004/0044571 A1 | 3/2004 | Bronnimann et al. | |
| 2004/0230491 A1 | 11/2004 | Messer et al. | |
| 2007/0067297 A1 * | 3/2007 | Kublickis | 707/9 |
| 2007/0130015 A1 * | 6/2007 | Starr et al. | 705/14 |

OTHER PUBLICATIONS

Provisional U.S. Appl. No. 60/690,634; submitted Jun. 15, 2005, System and Methods for a Video Marketplace, Steven Starr, pp. 1-37.*

* cited by examiner

*Primary Examiner* — Colleen Hoar
(74) *Attorney, Agent, or Firm* — Knobbe, Martens, Olson & Bear LLP

(57) ABSTRACT

Computer systems and associated payment models are disclosed for compensating content providers, such as web site operators, that cooperatively provide user access to content. In one embodiment, when a user selects a link provided by an "originator" entity (e.g., on a web site of the originator entity) to access a "target" entity's content (e.g., content displayed on the target entity's web site), the user is charged a small transaction fee, such as 0.1 cents. A portion of this fee is paid to the originator, and a portion is paid to the target. An additional portion may be retained by a service provider that processes the link selection transaction. Embodiments are also disclosed involving different flows of monetary compensation between the user, the originator, the target, and the service provider.

29 Claims, 7 Drawing Sheets

|  | CONTRIBUTION | REV SHARE |
|---|---|---|
| USER (CLICKER) | $C_U$ | $R_U$ |
| ORIGINATOR | $C_O$ | $R_O$ |
| TARGET | $C_T$ | $R_T$ |
| SERVICE PROVIDER | $C_{SP}$ | $R_{SP}$ |

*FIG. 2*

TARGET ACCOUNT

Account No.: Target123

Campaign ID: 1

Destination URL: [www.Target123.com]

Content Category: [Social Networks ▼]

Campaign Content: Text  Graphic

Campaign Termination Date: [MM-DD-YY]

Payment Parameters

Total per click: [    ]

Paid by: [User ▼]

| Payment Recipient | Percentage | EPC |
|---|---|---|
| Originator | 70 | (Calculated) |
| Target | 25 | (Calculated) |
| Service Provider | 5 | (Calculated) |
|  | 100% |  |

[Submit]

View/Edit your other campaigns

*FIG. 6*

COMPUTER-IMPLEMENTED METHODS FOR COMPENSATING ENTITIES THAT COOPERATIVELY PROVIDE ACCESS TO CONTENT ON WEB SITES

RELATED APPLICATIONS

This application is related to, but does not claim the benefit of, U.S. application Ser. No. 09/928,977, filed on Aug. 13, 2001 (hereinafter "the '977 application"), the disclosure of which is hereby incorporated by reference and is published as US 2002/0120567 A1.

BACKGROUND OF THE INVENTION

1. Field of the Invention

The present invention relates to computer-implemented methods for collecting payments associated with web browsing events, and for distributing the associated revenue, so as to provide incentives for web site operators to cooperatively provide access to content.

2. Description of the Related Art

A variety of compensation models and associated technologies exist for enabling web site operators to provide links to other web sites in exchange for monetary compensation. One such model, sometimes referred to as "ad syndication," allows web site operators to earn money by publishing advertisements or "sponsored links" that are delivered to users' web browsers by an ad server system. To participate as an ad publisher, a web site operator typically enrolls with an ad serving entity, and adds special coding to the web pages on which ads are to be displayed. When such a web page is loaded by a user's web browser, a server operated by the ad serving entity delivers one or more ads to present on the web page. Typically, the ads are selected based on the content of the particular web page, or in the case of a search request, based on one or more keywords supplied by the user. If the user clicks on an ad to access the web site of an advertiser, the advertiser is typically charged a fee by the ad serving entity. A portion of this fee is typically paid to the publisher.

Another model involving partnerships between web site operators is known as affiliate marketing. With this model, a web site operator typically enrolls to operate as an affiliate of an online business entity, such as an online merchant, and sets up an affiliate web site that includes one or more tagged links to the online business entity's web site. When a user follows such a link and then conducts a transaction (e.g., makes a purchase or creates an account), the affiliate is typically paid either a commission or a one-time bounty payment.

One problem with the foregoing and other models is that, in many cases, they do not provide a sufficient mechanism for compensating those who publish useful content, and/or links to such content, on the web. As one example, a small entity that creates a purely informational web site may not have the resources or reputation needed to charge users for its content. As a result, the entity likely will not have a monetary incentive to keep the web site updated with fresh content.

As another example, an individual may be capable of creating a highly useful online directory of web sites associated with a particular topic. Unless these web sites serve a commercial function, however, the operators of these web sites will likely be unwilling or unable to compensate this individual for taking the time to create such a directory. As a result, the individual may not take the time to create such a directory.

SUMMARY OF THE DISCLOSURE

Computer systems and associated payment models are disclosed for compensating content providers, such as web site operators, that cooperatively provide user access to content. In one embodiment, when a user selects a link provided on an originator web site by an originator entity, to access content provided by a target entity (e.g., content displayed on the target's web site), the user is charged a small transaction fee, such as 0.1 cents. A portion of this fee is paid to the originator, and a portion is paid to the target. An additional portion may be retained by a service provider that processes the link selection transaction. Embodiments are also disclosed involving different flows of monetary compensation between the user, the originator, the target, and the service provider. In addition, embodiments are disclosed in which the monetary amounts are varied automatically over time to achieve particular objectives.

Neither this summary nor the following detailed description purports to define the invention. The invention is defined by the claims.

BRIEF DESCRIPTION OF THE DRAWINGS

FIG. 2 lists the four entities (user, originator, target, and service provider) that are parties to a click transaction of the type shown in FIG. 1, and shows associated variables that can be specified to control who pays, and who is compensated, for each such transaction.

FIGS. 6 and 7 illustrate example account management pages of a user interface of the service provider system of FIG. 5.

DETAILED DESCRIPTION OF SPECIFIC EMBODIMENTS

Specific embodiments of the invention will now be described with reference to the drawings. These embodiments are described in order to illustrate, and not limit or define, the invention. The invention is defined by the claims.

I. TERMINOLOGY

The following terms are used throughout the following description. The term "originator" refers to an individual or other entity responsible for providing a link for accessing target content supplied by another individual or entity, referred to as a "target." The link may be visually represented as text, a button, a graphic, and/or another type of selectable element. In one embodiment, the link is provided on a first web site, referred to as an "originator site," and is selectable to access target content on a second web site, referred to as a "target site." The link may, but need not, be a "syndicated" link that is delivered to users' web browsers by a server that is separate from the originator site. The originator and target sites may, but need not, be owned or controlled by the originator and target, respectively.

The term "service provider" refers to an entity that is at least partially responsible for the following tasks: (a) collecting payments associated with transactions in which a user follows a link provided by an originator to access content provided by a target, and (b) distributing such payments, or portions thereof, to one or more associated entities, such as the originator and/or the target. The service provider may, in some embodiments, provide a web site through which potential originators and targets can establish linking arrangements, and/or provide a link syndication service for delivering links to web browsers for presentation within web pages of originator web sites.

The term "linking campaign" or "campaign" refers generally to an arrangement in which a target authorizes a service provider to provide user access from one or more originator sites to target content. For example, a target may set up a linking campaign which specifies the link text and target URL of a link that may be displayed on originator web sites. This linking campaign may also include parameters for controlling where and when the link is to be displayed and how the various parties are to be charged or compensated.

II. OVERVIEW

FIG. 1

Figure 1:
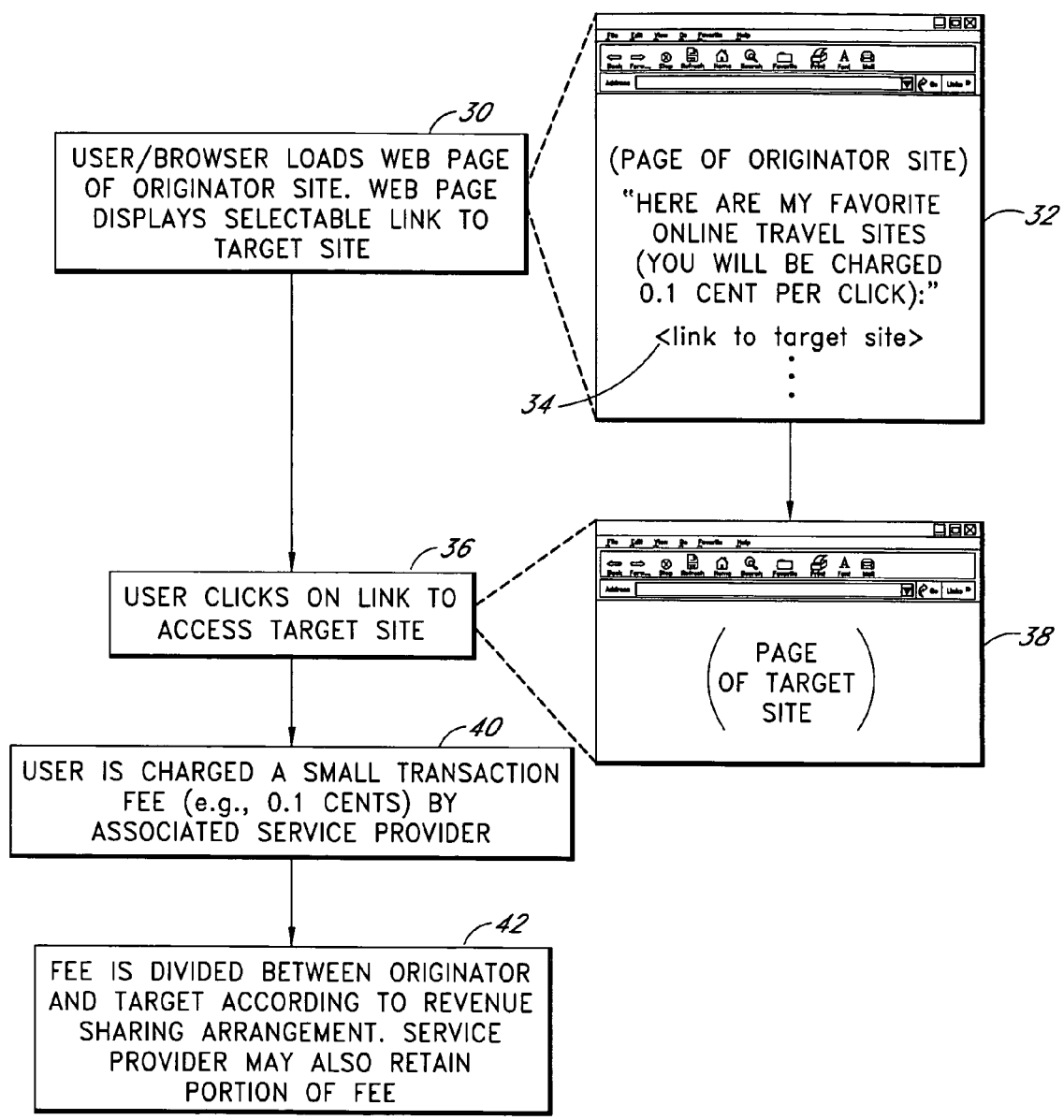
FIG. 1 illustrates a process by which a user may be charged a fee for clicking on a link from an originator web site to a target web site, and by which this fee may be divided among the other parties associated with the transaction.

FIG. 1 illustrates a process by which users are charged for access to content, and by which the associated revenue is divided among associated entities, according to one embodiment of the invention. In this example, it is assumed that the user who is accessing the content, as well as the originator and the target, have accounts with a service provider that collects and distributes payments. As will be apparent, the scenario depicted in FIG. 1 represents one possible payment model for creating incentives for entities, such as but not limited to web site operators, to post useful content on web sites. Variations to this model, and alternative models, are described in subsequent sections.

As depicted by block 30, the user initially loads a web page 32 of an originator site using a web browser. This web page includes a link 34 which is selectable by the user to access a target web site. Typically, this link 34 points to an intermediate server, such as a server operated by the service provider, that redirects the user's web browser to the target web site.

The link 34 may be a fully contained or "non-syndicated" link that is served by a server of the originator site. The link 34 may alternatively be a syndicated link that is served by a separate physical server operated by the service provider, as described below. In either case, the originator may add the link 34 (or coding for enabling syndication of the link) to the originator web site using a link creation tool, which may be provided on a web site of the service provider. As is known in the art, the link 34 may be tagged with a unique identifier of the originator to permit the service provider to identify the originator associated with a given click event. Regardless of whether the link 34 is syndicated or not, the link 34 is said to be "hosted by," or "displayed on," the originator web site.

As depicted in blocks 36 and 40 of FIG. 1, upon clicking on or otherwise selecting the link 34, the user's web browser requests and loads a web page 38 ("target web page") of the target site, and the service provider charges the user a transaction fee. The target web page 38 may be a publicly accessible web page that can be accessed on the Internet for free (i.e., no access control mechanism is provided). In such cases, the transaction fee charged by the service provider will typically be very small, such as 0.05 cents to 0.5 cents. For example, an originator site may display links to the home pages of a variety of publicly accessible target sites, in which case users may be charged a relatively small transaction fee, such as 0.1 cents, for each click event.

In other applications, an appropriate mechanism may be provided for inhibiting access by users that do not pay the transaction fee. For example, the target web page may be provided at a URL that is not accessible from other web pages of the target site, and/or may be a page that is not indexed by common Internet search engines. A higher degree of security may be provided by, for example, issuing a one-time-use or time-limited-use access code to the web browser via a browser redirect message. In such "access-controlled" applications, the transaction fees charged by the service provider will typically be higher (e.g., 5 cents or above).

Particularly where the transaction fees are relatively small (commonly referred to as "micropayments"), the service provider will typically aggregate a large number of small charges for purposes of collecting and distributing payments. For example, the service provider may charge users' credit cards, or withdraw money from the users' bank accounts, on a weekly or monthly basis, and/or when their respective totals reach a particular threshold such as $5. Alternatively, users may be required to pay the service provider in advance.

As illustrated in block 42 of FIG. 1, the collected transaction fee, or a portion of that fee, is ultimately divided between the originator and the target. For example, 80% of the transaction fee (or of a portion that remains after the service provider has extracted a service charge) may go to the originator, and the remaining 20% may go to the target. Thus, both the originator and the target benefit monetarily when a user follows the link 34 from the originator site to the target site. As discussed below, a given target may, via a web site of the service provider, be able to specify and publish a set of "linking terms" that specify the amount of the transaction fee, and how much of this fee will be paid to the originator. Potential originators may, in some embodiments, view the linking terms published by various potential targets for purposes of selecting target web sites to which to provide links.

An important benefit of the payment model depicted in FIG. 1 is that it provides an incentive for content providers, including individuals and organizations that operate small, informational web sites, to post content that is valuable to users. For example, an operator of a web site associated with a particular topic is given an incentive to provide links, as an originator, to other (target) web sites that provide additional information on that topic. In addition, the operator of the target web site is given a monetary incentive to provide content that is likely to attract users, and that is likely to motivate originators to provide links to the target site. These incentives exist regardless of whether the originator and target web sites otherwise serve a commercial function. For example, the originator and target sites may be purely informational, publicly accessible web sites that do not otherwise generate revenue.

In the example scenario depicted in FIG. 1, it is assumed that the user is recognized by the service provider (e.g., as the result of a cookie stored on the user's computer). If the user is not recognized, the service provider's system may, for example, respond to the user's selection of the link 34 by redirecting the user's web browser to an enrollment/login page that allows the user to either log-in or create an account with the service provider.

Further, the originator web page 32 shown in FIG. 1 depicts a use case in which the originator has selected the particular target sites to which links 34 are provided. In other use cases, the service provider's system may automatically select the target sites for the originator, such as by selecting from a pool of existing linking campaigns. This selection may, for example, be based on one or more of the following: (a) linking campaign selection criteria (target web site categories, etc.) supplied by the originator; (b) information about the originator web site or web page 32, as obtained via an automated analysis of web site content; (c) link targeting criteria (keywords, web site categories, geographic designations, target user profiles, etc.) supplied by particular targets in connection with particular linking campaigns; (d) linking campaign performance data maintained by the service provider; (e) information about the particular user who is requesting the originator web page 32, including but not limited to the user's purchase history and browse history.

In the scenario depicted in FIG. 1, the originator and target web sites may be operated or controlled by the originator and target, respectively. Alternatively, the originator and target web sites may host content supplied by the originator and target, respectively, but may be operated or controlled by other entities. For example, the originator may be an individual that creates a blog or a personal web page that includes a link to target content supplied by a target. This blog or personal web page may be part of a web site operated by another entity. The target content may similarly be a blog or a personal web page created by the target on another entity's web site.

Further, the access and payment model depicted in FIG. 1 may be practiced in the context of a single web site. For instance, the blog of an originator may provide a link to a blog of a target, with both of these blogs being hosted on the same web site. This web site may, for example, by provided by the service provider.

It will also be recognized that the methods and payment models described herein are not limited to web sites. For example, rather than providing a link on a web site, the originator may disseminate a link to a target's content via email, an RSS feed, an online services network, an interactive television system, or any other type of content dissemination system that supports user-selectable links between content. Similarly, the target may provide its content on any type of interactive system that supports linking between content. Further, although the particular embodiments described herein involve "links" to target content, the invention is also applicable to other methods by which users can select content to access; for example, in other embodiments, a user may request access to the target content via a voice command or via entry of a numeric or alphabetic character.

PAYMENT MODELS

FIG. 2

The scenario depicted in FIG. 1 represents one possible model for collecting and distributing fees associated with links between web sites or other content repositories. This "payment model" can be varied in a number of ways to generate additional payment models. Some of these possible variations will now be described with reference to the grid depicted in FIG. 2. Other variations will be apparent to those skilled in the art.

As illustrated in FIG. 2, four entities or "parties" participate in each click transaction: the user who clicks on or otherwise selects the link 34, the originator, the target, and the service provider. Any one or more of these four parties can potentially be charged for the click transaction, and any one or more of these parties can potentially receive all or a portion of the resulting revenue. The amount paid by each party for a click event is referred to as that party's "contribution," and the amount received is referred to as the party's "revenue share."

The contribution percentages are represented in FIG. 2 by the variables $C_U$, $C_O$, $C_T$, and $C_{SP}$, and the revenue share percentages are expressed by the variables $R_U$, $R_O$, $R_T$, and $R_{SP}$. Thus, for example, in the model depicted in FIG. 1, $C_U=100\%$; $C_O$, $C_T$, and $C_{SP}=0$; $R_U=0$; and $R_O$ and $R_T$ (and possibly $R_{SP}$) are each greater than zero. Several variations to this model are described below.

$C_T=100\%$. With this type of payment model, the target pays the entire contribution amount associated with the transaction. Typically, the contribution amount will either go entirely to the originator, or will be divided between the originator and service provider (e.g., the service provider may extract a service charge in the range of 2% and 15%). However, the contribution amount may go to any one or more of the user, the originator, and the service provider. This class of models is useful where, for example, the target derives revenue, or some other benefit, as the result of increased traffic to its web site.

$C_U>0$, $C_T>0$. With this type of payment model, both the user and the target pay a portion of the total contribution amount. Thus, the target pays for the benefit of having increased traffic to its web site, and the user pays for the added convenience of being able to locate the target site via the originator site. Typically, the total contribution amount will be divided between the originator and service provider. For example, the service provider may retain a small service charge between 2% and 15% of the contribution amount, and pay the remainder to the originator. Alternatively, the total contribution amount may be paid to the originator.

$C_O>0$. With this type of payment model, the originator pays at least a portion of the total contribution amount. This model type may be useful where, for example, the originator somehow benefits from increased traffic to the target site. For example, a musical artist may provide a link on its web site to a target web site that sells the artist's music, and may therefore be willing to pay to have users follow this link. The fee paid by the originator in this model may be divided between any one or more of the user, the target, and the service provider.

$C_{SP}>0$. With this type of payment model, the service provider pays at least a portion of the contribution amount. This may be useful where, for example, the service provider wants to provide an incentive, such as during a promotional period, for originators, targets, and/or users to sign up for its service.

$R_U>0$. With this type of payment model, the user is paid for clicking on links from originator sites to target sites. This model may be useful where, for example, the target is willing to pay users to access its web site or content. An appropriate mechanism may be provided for limiting the number of times a given user can be compensated for clicking on a particular link 34, or set of links, to a particular target site. For example, the user may only be paid the first time he or she clicks on a particular link 34. To inhibit click fraud, the target may be charged, and the user paid, only where the user meets certain criteria (e.g., has a credit card on file with the service provider). As one example of this model, the target may be charged a fee the first time a given user clicks on the link 34 (but not for subsequent clicks by this user), and all or a portion of this fee may be divided for payment to the user and the originator; the remainder, if any, may be retained by the service provider.

$R_O>0$; $R_U$ and $R_T=0$. With this type of payment model, the originator is paid the full contribution amount minus any service charge extracted by the service provider. The contribution amount is typically paid solely by the target, but may additionally or alternatively be paid by the user. This model provides a maximum incentive for others to provide links on their web sites to participating targets.

$R_{SP}=0$. With this type of payment model, the service provider does not receive any portion of the contribution amount. This model type may be used where, for example, the service provider charges the targets, the originators, and/or the users a flat fee, such as a monthly subscription fee, for using its service.

Payment models in which the revenue distribution can vary from click to click (or selection to selection) are also possible. The following are examples of such variable-revenue-share payment models.

$R_O$ Decreases and $R_T$ Increases Over Time.
With this type of model, the revenue share of the originator decreases over time while the revenue share of the target increases. For example, upon inception, the revenue may be divided 90/10 between the originator and target, and at a later point in time, revenue may be divided 60/40 between the two entities. This may be accomplished by, for example, making the $R_O$ and $R_T$ values functions of time, functions of total clicks, functions of total unique users who click, or some combination thereof. This type of model gives the originator an incentive to "try out" a new target.

Revenue Distribution Depends on Originator's Level of Participation.
With this type of model, the revenue distribution may depend, for example, on how many linking campaigns the originator surfaces or participates in, or on how much traffic the originator generates. For example, an originator that is subscribed to a large number of linking campaigns, or that originates a large number of clicks, may be entitled to a higher revenue share per click than less active originators; the revenue share of the target and/or the service provider may be decreased to account for the increased payment to the originator.

Revenue Distribution Depends on Target's Level of Participation.
Similarly, the revenue distribution may depend on the target's level of participation. For example, a target that creates a large number of linking campaigns over a period of time, or that creates linking campaigns that are very successful, may be entitled to a higher revenue share per click, or to a lower contribution if the model requires the target to pay for clicks.

All of the foregoing payment models, and all valid combinations of these models, are within the scope of this disclosure and represent embodiments of the invention. Each such model may be implemented in software executed by one or more computers operated by, or on behalf of, the service provider.

IV. USER FEE OPTIONS

In models in which $C_U$ (the contribution of the user) is non-zero, a number of different options are possible for charging users. The following are specific examples.

$C_U$ is Fixed.
With this approach, the user pays a flat fee per click.
$C_U$ Decreases with Usage.
To encourage high volume use, the service provider (or an originator or target) may offer a plan in which the amount paid per click by the user decreases gradually, or as a step function, as the user performs click transactions. For example, once a user reaches a particular monthly threshold, the amount paid per click may drop from 0.1 cents to 0.05 cents. As another example, once a user has clicked on some monthly or weekly threshold number of links 34 to a particular target's site, the user may be charged a reduced rate, or no fee at all, for subsequent clicks on links to the same target site.

$C_U$ Increases with Usage.
The amount paid per click may be increased after a specified number of clicks, or after a trial time period. For example, to provide an incentive to new users, the service provider may charge the user a reduced rate per click (which may be zero) until the user has reached a particular click threshold.

$C_U$ Decreases with Time for Particular Content.
The user's contribution per click with respect to a particular item or collection of content on a target site may decrease gradually or as a step function based the freshness of the content (e.g. cost per click in first 48 hours is $0.50, after 48 hours is $0.25, after 120 hours is $0.10). This may be appropriate for content that is time sensitive or is highly demanded at the time of initial release.

Subscription Offered by Service Provider.
Rather than requiring users to pay per click, the service provider may offer one or more types of unlimited-access subscriptions. For example, by paying a fixed monthly fee, the user may be granted unlimited access to all target site content in the network, all content within a certain category of target sites (e.g., all social networking sites), or all content defined by some other attribute (e.g. all stock quotes, or all digital content under $25). For purposes of determining the amount of the revenue share payment(s) to the originator and/or target, the user's contribution per click may, for example, be calculated by dividing the monthly subscription fee by the total number of click transactions performed by the user during the particular billing cycle.

Subscription Offered by Target Site.
A particular target site may offer an option for a user to pay one fee to access all content, or all content of a particular type, on the target site.

V. CLICK TRANSACTION PROCESS FLOW

Figure 3:
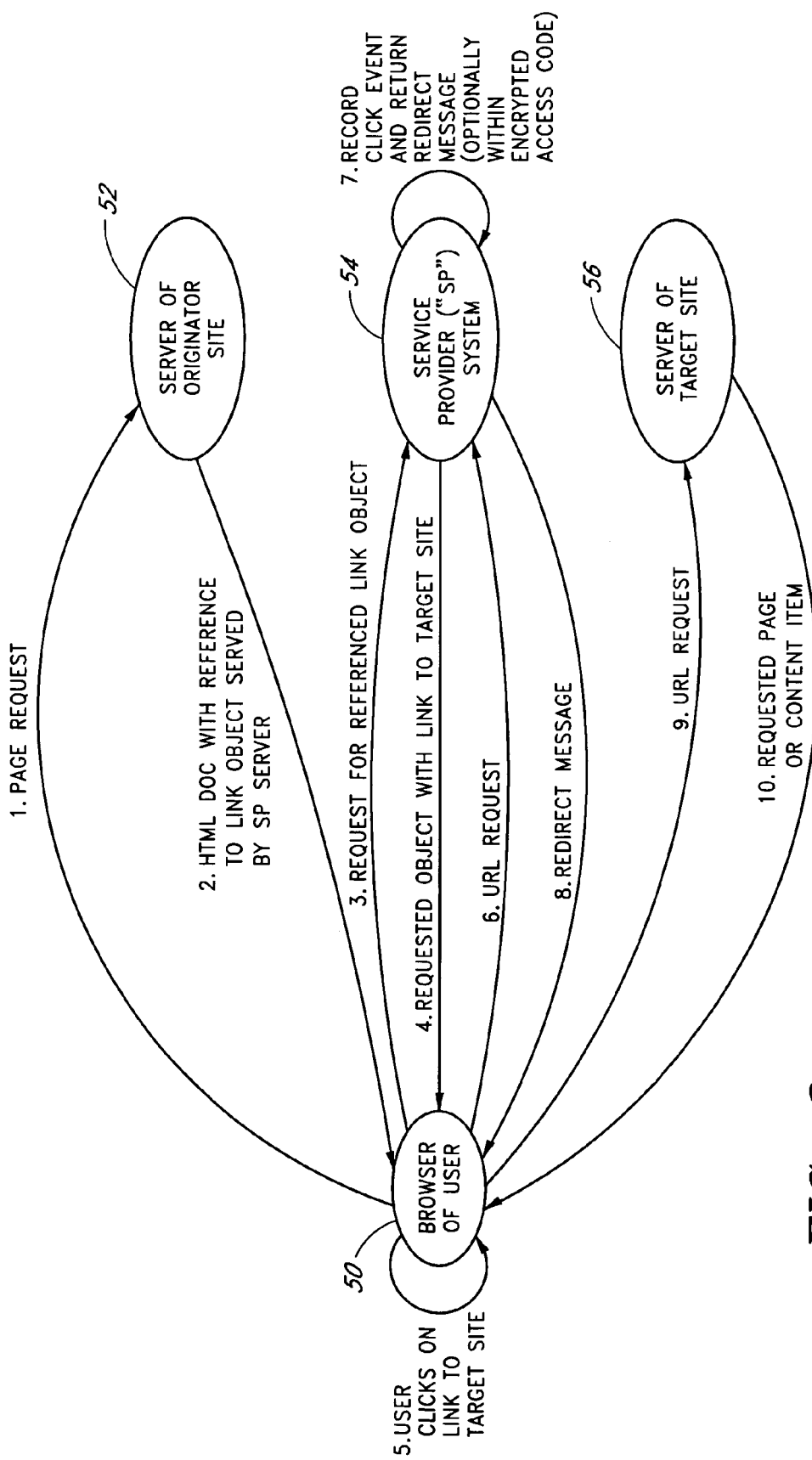
FIG. 3 illustrates one example of a sequence of interactions that may occur between computers associated with the user, the originator, the target, and the service provider in connection with a click transaction.
Figure 4:
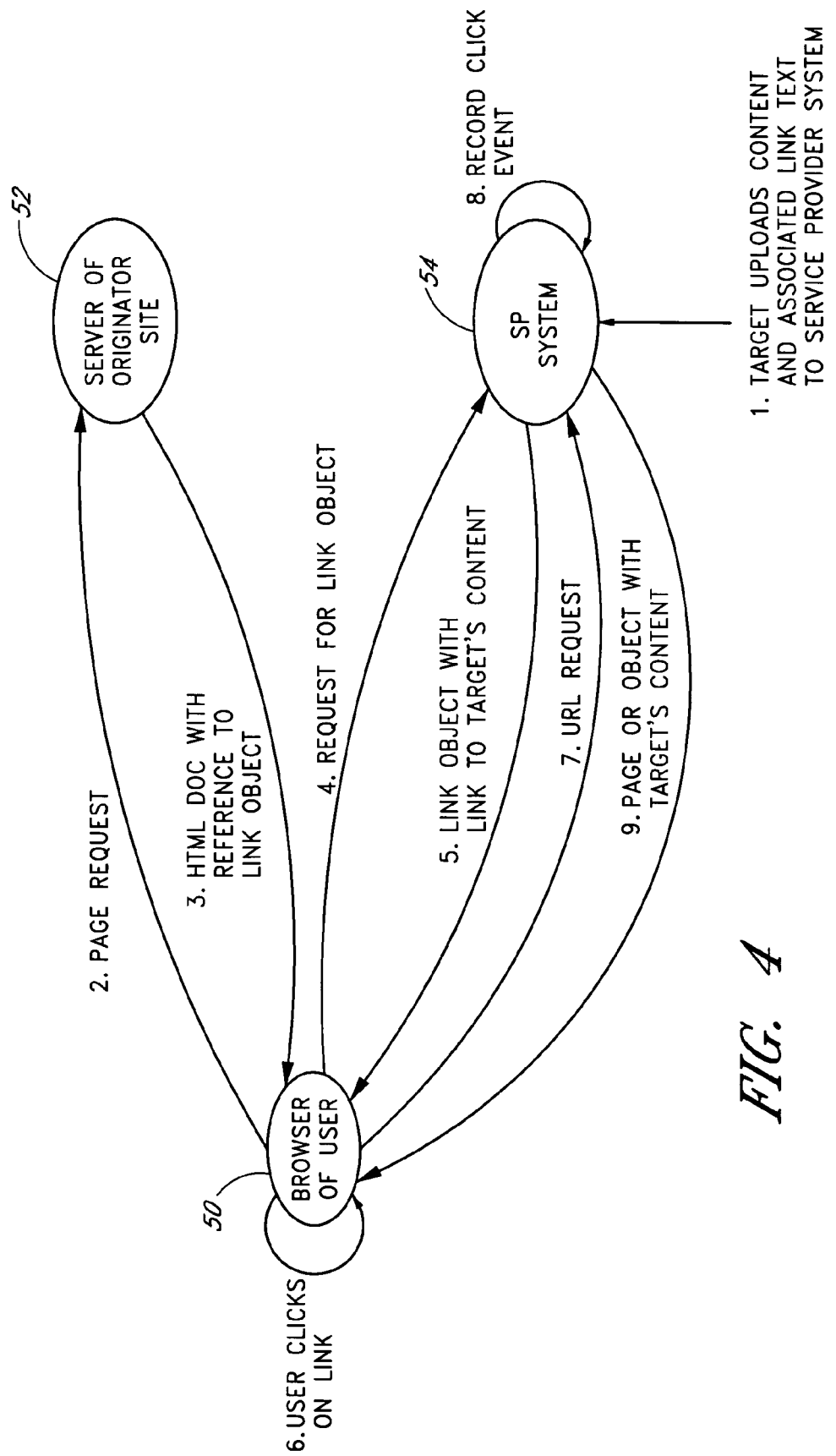
FIG. 4 illustrates a sequence of interactions between computers according to another embodiment.

FIGS. 3 and 4

FIGS. 3 and 4 each illustrate an example of a sequence of interactions that may occur over the Internet between computer systems of the four parties in connection with a click transaction involving a syndicated link. The numbers shown in these figures denote the sequence in which the illustrated events occur. The "browser" component 50 illustrated in each figure represents a web browser program running on a computing device, such as a Personal Computer, a Personal Digital Assistant, a web-enabled phone, or a set top television box, associated with a particular user. The service provider ("SP") system 54 shown in FIGS. 3 and 4 represents a computer system operated by the service provider. The servers 52 and 56 shown in FIG. 3 represent computers or computer systems that host the originator web site and the target web site, respectively.

In the example illustrated in FIG. 3, the web browser 50 of the user initially sends a page request to the server 52 of the originator web site (event 1). In response, the server 52 returns an HTML document corresponding to the requested page (event 2). In this example and in the example of FIG. 4, the HTML document includes a reference to a link object served by the SP system 54. This reference may, for example, be in the form of HTML or JavaScript code added to the HTML document by the originator.

The browser 50 responds to this reference by sending a request for the link object to the SP system 54 (event 3). Assuming the user has previously registered with the SP system 54, this request will typically be accompanied by a cookie file associated with the user. In response to this request, the SP system 54 returns the link object for display within the web page (event 4). In some embodiments, this link object may correspond to a linking campaign dynamically selected by the SP system 54 at the time of the request. For example, the SP system 54 may select a campaign based on one or more of the following: selection criteria specified by the originator; campaign performance data; information about the originator site or page on which the link will be displayed; profile data of the user (if recognized) making the request.

The link object may include link text and/or graphics previously specified by the corresponding target (and optionally customized by the originator), and may be presented on the web page as a clickable link 34. For example, the link object may be displayed to the user as a textual link, a button, a graphic, and/or any other type of content item that can be selected by the user. Typically, the link object will include a short textual designation of the target site or content to which it points, and will include a visual indication that the user will be charged a fee for clicking on the link. The amount of the transaction fee may also be indicated. For example, the link text may read "Winning investing strategies [0.1¢]." Assuming the user is recognized by the SP system 54, the SP system may also personalize the appearance of the link object, such as by displaying the user's name, and/or by displaying an indication of whether the user has previously accessed the corresponding target site.

In response to user selection of the link (event 5 in FIG. 3), the user's web browser 50 sends a URL request, along with a cookie file, to the SP system (event 6). This request may, for example, include some or all of the following items, all of which may be included in the link coding of the link object: (1) an identifier of the target web site and content; (2) an identifier of the originator or originator site; and (3) an identifier of the linking campaign to which the link corresponds. The identifier of the target web site and content may be provided in an obfuscated form to inhibit users from circumventing the service provider. For example, rather than including the URL of the target site and content, an encrypted version of this URL, or an identifier that can be used by the SP system to look up this URL, may be used.

In event 7, the SP system 54 logs this URL request for billing purposes, and redirects the user's browser 50 to the target server 56 (event 8). In some embodiments, the SP system may return an encrypted access code as part of the redirect message (e.g., by appending the access code to the target URL), in which case the target server 56 may run a program for validating the access codes. Examples of methods that may be used to generate and check URL-based access codes are described in the '977 application. The browser 50 responds to the redirect message by sending a URL request to the target server 56 (event 9), which responds by returning the requested page or content item.

In the embodiment depicted in FIG. 3, the link 34 is said to point indirectly to the target site since selection of the link causes the SP system 54 to redirect the user's browser to the target site. In other embodiments, the link 34 may alternatively point directly to the target site; in such embodiments, the target site and/or the originator site may include functionality for reporting link selection events to the SP system 54.

FIG. 4 illustrates an embodiment in which the target content is hosted by the SP system 54. In this embodiment, the target initially uploads content to, or creates content on, a target web site hosted by the SP system 54. This content may, for example, be a blog, a web page (or collection of web pages), a digital media item such as an audio or video file, or any other type of content item to which a link may be provided. The target also specifies associated link text (and/or a link graphic) of an associated link to be hosted on originator sites. These steps are represented as event 1 in FIG. 4.

It is assumed in the sequence shown in FIG. 4 that the originator has already added the necessary coding for displaying this link on one or more pages of the originator web site. When the web browser 50 requests such a page (event 2), the server 52 of the originator site again responds by returning an HTML document with a reference to a link object (event 3). The web browser then requests the link object from the SP system (event 4), which returns the link object for display within the web page (event 5). When the user clicks on the associated link element on the page (event 6), the web browser sends an associated URL request to the SP system (event 7) to request the content uploaded by the target. The SP system records this click event, in a database for subsequent payment processing (event 8), and returns the requested page or content item to the browser (event 9). The click event data recorded by the SP system 54 may, for example, include identifiers of the user, the originator, the target, and the linking campaign.

In the examples illustrated in FIGS. 3 and 4, the user is assumed to already be registered with the service provider. If the user is not yet registered, or is registered but is not recognized (e.g., because the user registered using a different computer, or because a browser cookie set by the SP system has expired), the SP system 54 may, upon selection of the link displayed on the originator site, prompt the user to register or log in.

Also, as mentioned above, the sequences depicted in FIGS. 3 and 4 represent embodiments in which link syndication is used. In embodiments in which the link 34 to the target site is not syndicated, the events involving the retrieval of the link object from the SP system 54 are omitted.

VI. SERVICE PROVIDER SYSTEM

FIG. 5

Figure 5:
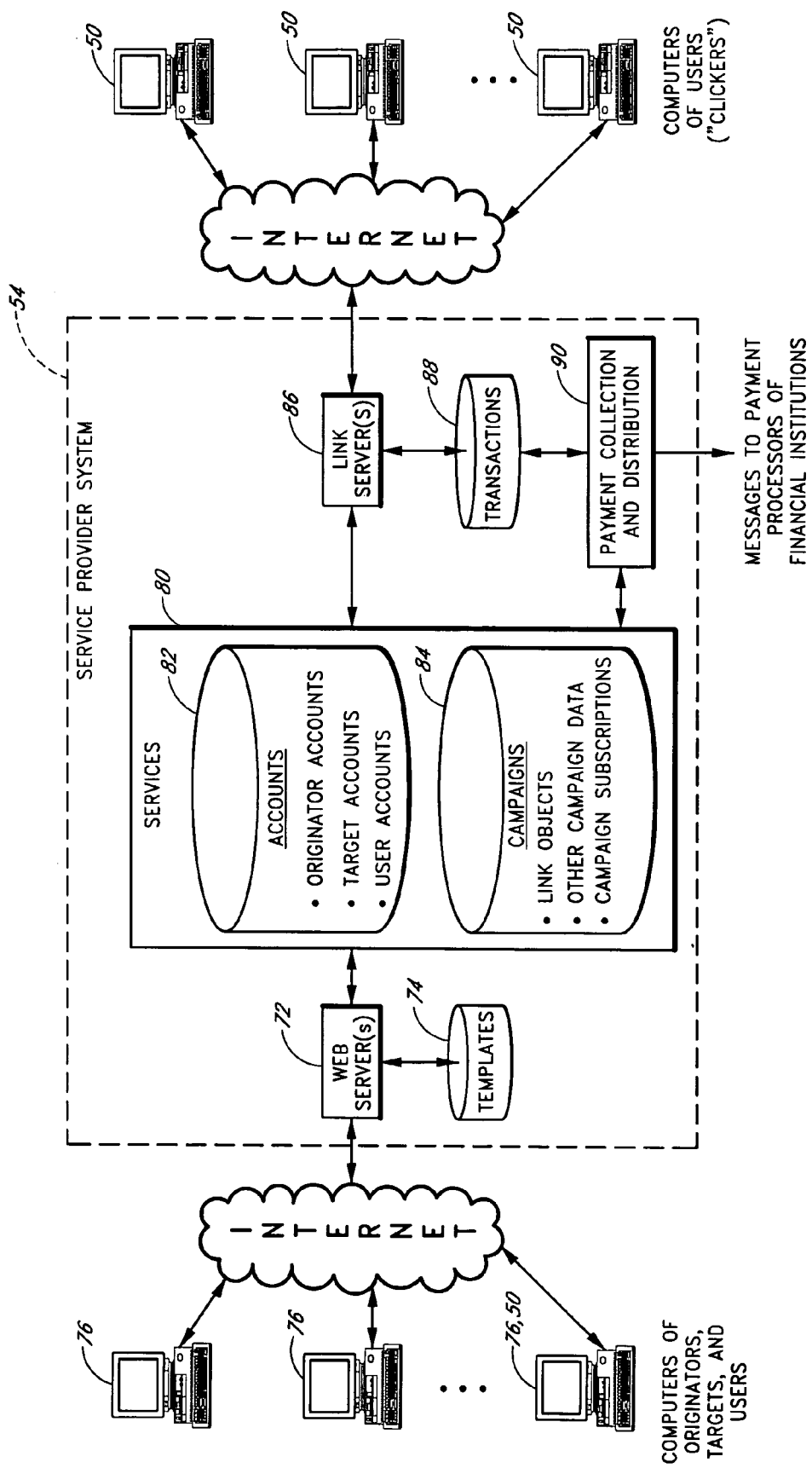
FIG. 5 illustrates components of a service provider system according to one embodiment of the invention.

FIG. 5 illustrates components of a service provider system 54 that may be operated by the service provider to implement the various processes described above. The system 54 includes one or more web servers 72 that are accessed via the Internet by originators, targets, and end users. The web servers 72 provide access to a collection of web pages that include functionality for setting up accounts with the service provider. Using these web pages, an entity can set up one or more accounts to operate as an originator, a target, or an end user. A given individual or entity can register to operate in two or more of these capacities; for example, a given web site operator may operate as both an originator and a target.

As illustrated in FIG. 5, the web servers 72 accesses a repository 74 of templates that are used to dynamically generate web pages in response to page requests from computing devices 76 associated with the three types of entities. The web servers 72 also access a set of services 80 that provide functionality for setting up and managing the accounts. As illustrated, these services 80 maintain a data repository 82 of account information in connection with accounts that have been set up via the system.

Figure 7:
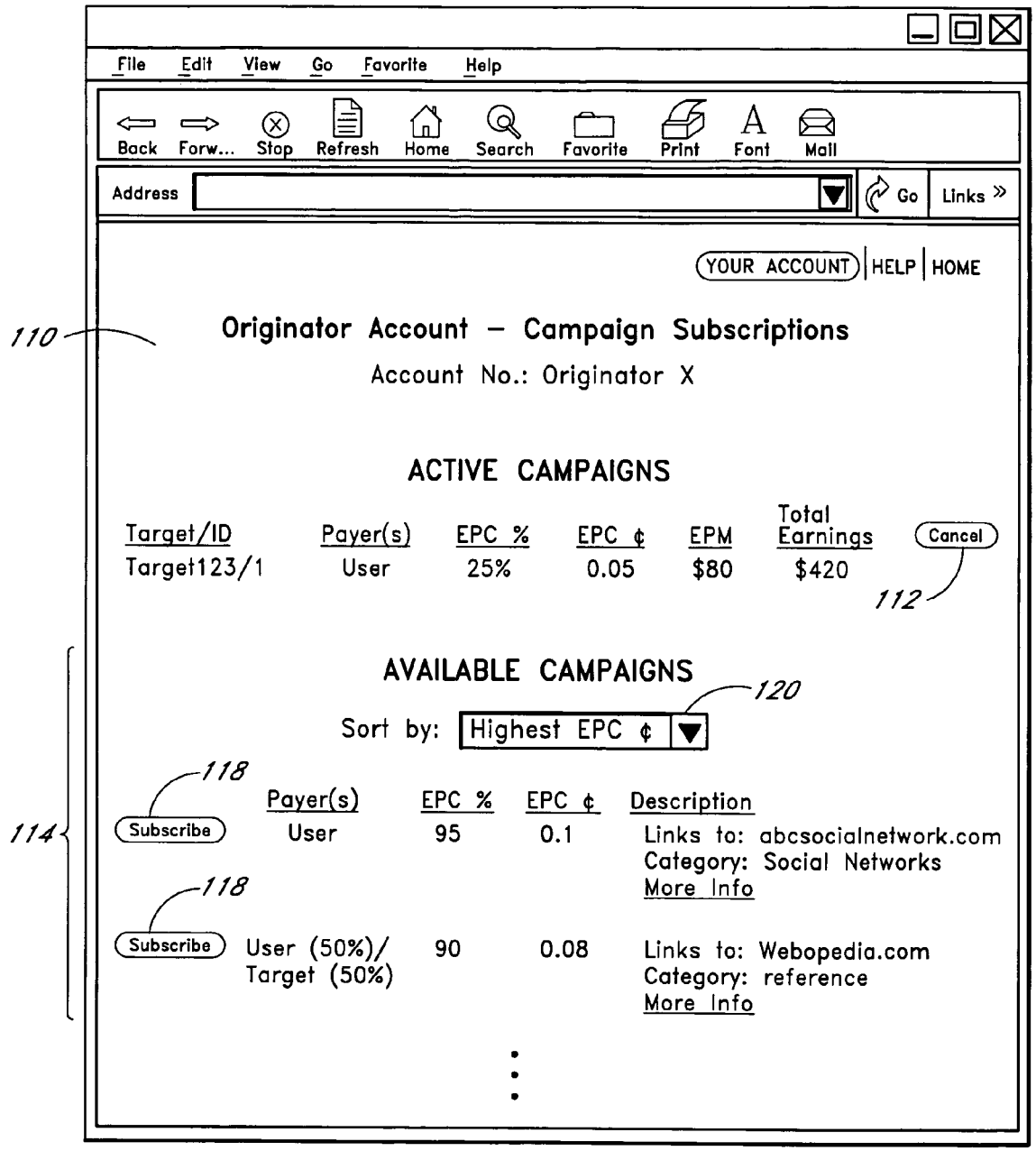

The services 80 also maintain a campaigns data repository 84 containing information about particular linking campaigns that have been set up by targets and subscribed to by originators. (Example web pages for creating and subscribing to linking campaigns are shown in FIGS. 6 and 7 and are discussed below.) This campaign information may include, for example, the text and/or graphics of link objects that are served or "syndicated" by the system 54, information about current subscriptions by originators to specific linking campaigns, and linking terms used by the system 54 to collect and distribute associated transaction fees. The linking terms stored in connection with a given linking campaign may, for example, include values for some or all of the variables depicted in the grid of FIG. 2. Although shown as two separate repositories 82, 84 for purposes of illustration, any number of distinct databases or data repositories may be used to store the various types of data.

As further illustrated in FIG. 5, the service provider system 54 includes one or more link servers 86 that retrieve link objects from the campaigns repository 84 for display within web pages of originator web sites. The link servers 54 may interact with the computers/browsers 50 of the end users according to one or both of the methods depicted in FIGS. 3 and 4. When a registered user clicks on a link served by a link server 86, the link server records the click event, including the ID of the user, an ID of the associated link object or linking campaign, and the ID of the originator, in a transactions database 84. Transaction data recorded in this database 84 is used by a payment collection and distribution component 86 to collect payments from, and distribute payments to, specific originators, targets, and users in accordance with associated payment terms. As is conventional, payments may be collected and distributed by the system 54 by sending messages over a network to the payment processors of one or more banks or other financial institutions.

All of the components of the service provider system 54 shown in FIG. 5 may be implemented in software modules executed by general purpose computers. The software modules may be stored in any type or types of computer storage devices and memories. The physical computers of the system 54 need not reside in the same geographic location, but rather may be distributed geographically.

VII. EXAMPLE ACCOUNT MANAGEMENT UI

FIGS. 6 and 7

FIG. 6 illustrates an example web page 100 of an account management user interface that may be provided by the service provider system 54 to enable targets to manage their respective accounts. The web page 100 lists an account number of a particular target for which the page has been generated, and is associated with a particular linking campaign of the target. The campaign information included on the web page 100 includes a campaign ID, the associated destination URL of the target site (which can be entered by the target), a content category of the target site or content (which is selectable via a drop-down box in this example), and links 102, 104 for specifying the text and/or graphics of the associated link object. In some embodiments, a target may be permitted to supply or specify multiple different visual objects, in which case an originator who subscribes to the associated linking campaign may be permitted to select a particular one of these visual objects to display. Further, the originators may be permitted to specify or customize the link text and/or graphics to be displayed on their respective web sites.

The web page shown in FIG. 6 also includes a field 105 for specifying an optional termination date of the campaign. For payment models in which the target pays for each click, the target may additionally or alternatively specify a monetary budget, and the campaign may be treated as terminated once this budget is depleted. Upon termination of a campaign, any originators that are subscribed to the campaign may be notified by email or other communications method. If, following campaign termination, an originator fails to update its web pages to remove the link coding associated with that campaign, the SP system may automatically select an alternative linking campaign to use on such web pages. In embodiments in which the service provider selects the campaigns for the originator, the originator need not be concerned with campaign termination.

The web page 100 shown in FIG. 6 also includes a "payment parameters" section for viewing and specifying associated payment parameters. The payment parameters in this example include a transaction fee amount to be charged for each click by a registered user, a designation of the payer or payers of this amount (selectable via a drop down box 106), and the percentages of this amount that are to go to the originator, the target, and the service provider. (In embodiments in which only the end users pay for the click transactions, the ability to specify the payer is omitted.) With the exception of the percentage retained by the service provider, all of these payment parameters can be specified by the target, and submitted to the system, via the web page 100. Once an originator has subscribed to a particular linking campaign, the target's ability to change the associated parameters may terminate, or may be appropriately limited.

Although the user payment amount in this example is specified in absolute terms, the target may alternatively be permitted or required specify this amount as a percentage of some other amount. For example, where two different entities are to be charged for each click, the target may specify the total monetary amount per click, and then specify the percentage of this amount to be contributed by each of the two payers.

Although not illustrated in FIG. 6, the system 54 may also provide an option for the target to specify one or more parameters or formulas for varying the payment parameters over time. For example, the user interface may permit the target to specify a different set of percentages that are to be applied, within a given campaign subscription, once a certain number of clicks have occurred.

It should be understood that FIG. 6 depicts one of many possible ways in which the payment parameters associated with a particular linking campaign may be specified. For example, in some embodiments, some or all of the payment parameters may be specified by the service provider, the originator, or both.

The account management interface exposed to targets may also provide tools for the targets to evaluate campaign performance. For example, for each campaign of a target, the system may report to the target some or all of the following metrics: total clicks, click-through rate (assuming link impressions are tracked), total charges/fees, earnings per month (EPM), total unique users, total new users, number of unique originators or originator sites subscribed to campaign. Functions may also be provided for modifying an existing campaign (such as by changing the link text or budget), and manually canceling a campaign.

FIG. 7 illustrates an example web page 110 of an account management user interface that may be provided by the service provider system 54 to enable originators to manage their respective accounts. This web page 110 depicts an embodiment in which the originators can subscribe to particular campaigns; in other embodiments, the ability to subscribe to particular campaigns may be omitted. The web page 110 lists the account number of a particular originator, and lists the originator's "active campaigns" (one shown), which are the linking campaigns to which the originator is currently subscribed. For each active campaign, the web page 110 includes the following information: an identifier of the associated target and linking campaign; an indication of the designated payer (which may be omitted in embodiments in which only the user pays), the originator's earnings-per-click percentage (EPC %) and amount (EPC ¢), the average earnings per month (EPM) for this subscription, and the total amount earned by the originator for this subscription. The EPC values are based on the campaign information supplied by the corresponding target via the user interface of FIG. 6. A "cancel" button 112 is also provided to enable the originator to discontinue its participation in this campaign.

With further reference to FIG. 7, the web page 110 also includes an "Available Campaigns" section 114 that lists other campaigns to which the originator can subscribe, if desired. The linking campaigns of many different targets may be listed in this section 114. In this particular example, the information displayed for each available campaign includes a designation of the payer(s); the earnings-per-click percentage and amount being offered to originators, and a description of the target campaign, which indicates the target site and site category in this example. The EPC values shown for each available campaign represent linking terms specified by the associated target.

Any of a variety of other types of information about the available campaigns may be provided to assist originators in selecting linking campaigns. For example, various statistics associated with each target site and campaign may be displayed, such as traffic rank, number of current subscriptions, date of site inception, and date of campaign inception.

If the originator selects the "subscribe" button 118 associated with a particular linking campaign, the originator enters a subscription pipeline (not shown). This pipeline may include various options for specifying the appearance and content of the link, and may allow the originator to specify whether the associated link is to by statically hosted by the originator versus served (syndicated) by the service provider. At the end of this pipeline, the originator may be provided with a short code segment to incorporate into one or more HTML documents of the originator's web site, as is known in the art in the context of advertisement syndication programs. The subscription selections of the originator are recorded by the system 54 in a data repository, as described above.

As further illustrated in FIG. 7, the originator can use a drop down box 120 to sort the available linking campaigns based on various criteria, such as highest EPC %, highest EPC ¢, who pays, and/or campaign category. A search engine (not shown) may also be supplied to permit originators to submit keyword-based search queries to search for linking campaigns.

Although not depicted in FIG. 7, the originator may also be given the option (or may be required) to have the service provider select the campaigns for which links 34 are to be displayed on the originator site. For example, the originator may be prompted to specify campaign selection criteria (e.g., target site category, content category, minimum revenue share percentage, keywords, or any combination thereof) to be used by the SP system 54 to auto-select campaigns. Further, in some embodiments, an originator may be given the option to specify the revenue share (percentage) it is willing to accept for a given campaign, and the target may then be given the option to accept or reject this offer.

VIII. REPEAT ACCESSES TO TARGET CONTENT

The SP system 54 may also provide functionality for assisting users in re-accessing previously-visited target sites and content. As one example, each user may have access to a personal history page which includes links to all of the target content visited by the user over a specified time period, together with associated transaction details. This history pay may also include corresponding links for re-accessing such content.

Depending upon the repeat access policy implemented in connection with a given campaign, the user may or may not be charged for re-accessing a previously visited target URL. For instance, the user may be permitted to re-access the target URL free of charge for a limited amount of time (e.g., 24 hours) from the most recent fee-based access to that URL, or may be entitled to re-access the target URL a designated number of times before being charged again. In some embodiments, the target may be given the option to specify the repeat access policy to be used with a particular campaign. The history page may also include functionality for sorting the transaction history by content category, repeat access policy, link expiration date, and/or other criteria.

Repeat accesses to paid-for content may also be facilitated by providing a server-side bookmarking service. For example, the system 54 may allow users to bookmark their favorite target URLs from their transaction history pages, and/or from the target web pages themselves using a special browser toolbar program. The bookmarks may be displayed on a personal web page served by the SP system, and/or may be displayed via a browser toolbar.

IX. CONCLUSION

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims, which are intended to be interpreted without reliance on any explicit or implicit definitions that may be set forth in any incorporated-by-reference materials.

What is claimed is:

1. A computer-implemented method, comprising:
    detecting a link selection event in which a user selects a link on a web page of an originator web site of an originator entity to access a target web site of a target entity;
    in response to the link selection event, programmatically causing the user to be charged a first fee and the target entity to be charged a second fee, said first and second fees being based on a linking campaign of said target entity;
    calculating a monetary amount to be paid to the originator entity in connection with the link selection event in accordance with said linking campaign, said monetary amount being greater than the first fee and greater than the second fee; and
    programmatically causing said monetary amount to be paid to the originator entity in connection with the link selection event, whereby the user and target entity each contribute to a payment made to the originator entity in accordance with said linking campaign;
    the method being performed by a service provider computer system that is separate from the originator web site and the target web site, said service provider computer system operated by a service provider entity that is different from the originator entity and the target entity;
    wherein the monetary amount is calculated by the service provider computer system by summing the first and second fees to generate a total contribution amount, and by deducting from said total contribution amount a transaction fee charged by the service provider.

2. The method of claim 1, wherein detecting the link selection event comprises receiving, at a server of said service provider computer system, a request message generated by a user computer in response to the link selection event, and wherein the method further comprises responding to the request message by redirecting the user computer to the target web site.

3. The method of claim 1, wherein the method further comprises, prior to the link selection event:
  receiving, at the service provider computer system, linking campaign information supplied by the target entity for said linking campaign, said linking campaign information directly or indirectly specifying said monetary amount;
  electronically communicating at least a portion of the linking campaign information, including an indication of said monetary amount, to the originator entity in conjunction with an identifier of the target web site; and
  receiving, at the service provider computer system, and recording in an electronic data repository, a request from the originator entity to subscribe to the linking campaign.

4. The method of claim 3, wherein the linking campaign information specifies amounts of the first and second fees.

5. The method of claim 1, wherein the first and second fees are micropayment fees.

6. The method of claim 1, wherein the amounts of the first and second fees are each less than one cent.

7. The method of claim 1, wherein the link provides access to a destination URL for which no access control mechanism is provided, said destination URL corresponding to a web page of the target web site.

8. The method of claim 1, further comprising calculating said transaction fee as a percentage of said total contribution amount.

9. The method of claim 1, wherein the method comprises programmatically dividing the sum of the first fee and the second fee between the service provider entity and the originator entity.

10. The method of claim 1, wherein the method further comprises the service provider computer system serving the link over a computer network to a web browser of the user for display within the web page.

11. The method of claim 1, further comprising calculating the monetary amount according to a formula in which an amount paid to the originator per link selection event varies over time.

12. A computer-implemented method, comprising:
  detecting, via a computer network, a link selection event in which a user selects a link on a web page of an originator web site of an originator entity to access a target web site of a target entity;
  in response to the link selection event, programmatically causing the user to be charged a micropayment transaction fee;
  calculating, by a computer system, a first portion of the transaction fee to be paid to the originator entity as compensation for originating the link selection event, and programmatically calculating a second portion of the transaction fee to be paid to the target entity, such that the first and second portions are calculated according to a method in which a division of transaction fee revenue between the originator entity and the target entity changes over time in favor of one of said entities over the other; and
  causing the first portion of the transaction fee to be paid to the originator entity, and the second portion of the transaction fee to be paid to the target entity.

13. The method of claim 12, wherein the amount of the transaction fee is less than one cent.

14. The method of claim 12, wherein the method comprises calculating the first and second portions according to a method in which revenue shares of the originator entity and target entity change over time as a function of at least one of the following: (a) time, (b) total number of link selections, (c) total number of unique users that perform a link selection.

15. The method of claim 12, wherein said division of transaction fee revenue changes over time such that a revenue share of the originator entity increases over time while a revenue share of the target entity decreases over time.

16. The method of claim 12, wherein said division of transaction fee revenue changes over time such that a revenue share of the target entity increases over time while a revenue share of the originator entity decreases over time.

17. The method of claim 12, wherein the amounts of the first and second portions are each less than one cent.

18. The method of claim 12, wherein the method is performed by said computer system in association with a linking campaign of the target entity, and the method further comprises, prior to the link selection event:
  receiving, at the computer system, information supplied by the target entity directly or indirectly specifying, for the linking campaign, an amount to be paid to originator entities for link selection events;
  electronically notifying the originator entity of said amount; and
  receiving, at the computer system, and recording in an electronic data repository, a request from the originator entity to subscribe to the linking campaign.

19. The method of claim 12, wherein the link points, directly or indirectly, to a destination URL for which no access control mechanism is provided, said destination URL corresponding to a web page of the target web site.

20. The method of claim 12, wherein detecting the link selection event comprises receiving a request message generated by a web browser in response to selection of the link by the user.

21. The method of claim 20, further comprising responding to the request message by redirecting the web browser to the target web site.

22. The method of claim 12, further comprising programmatically causing a portion of the transaction fee to be paid to a service provider entity.

23. A networked computer system programmed to perform a method that comprises:
  detecting, via a computer network, a link selection event in which a user selects a link on a web page of an originator web site of an originator entity to access a target web site of a target entity;
  in response to the link selection event, programmatically causing the user to be charged a micropayment transaction fee;
  calculating a first portion of the transaction fee to be paid to the originator entity as compensation for originating the link selection event, and calculating a second portion of the transaction fee to be paid to the target entity, such that the first and second portions are calculated according to a method in which a division of transaction fee revenue between the originator entity and the target entity changes over time in favor of one of said entities over the other; and causing the first portion of the transaction fee to be paid to the originator entity, and the second portion of the transaction fee to be paid to the target entity;

said networked computer system comprising one or more physical computers.

24. A computer-implemented method for facilitating linking between web sites, the method comprising:

receiving over a computer network, from a target entity associated with a target web site, linking campaign information for originator entities to provide links for navigating from their respective originator web sites to the target web site, said linking campaign information directly or indirectly specifying a first monetary amount to be charged to a user, a second monetary amount to be charged to the target entity, and a third monetary amount to be paid to an originator entity, for a link selection event in which a user selects a link on an originator web site to access the target web site, said third monetary amount being greater than the first monetary amount and greater than the second monetary amount, such that the user and the target entity each contribute to a payment made to the originator entity;

communicating at least a portion of the linking campaign information, including an indication of the third monetary amount and an identification of the target web site, over a computer network to at least a first originator entity;

receiving over a computer network, and recording in an electronic data repository, a request by the first originator entity to establish a linking arrangement with the target entity in accordance with the linking campaign information;

subsequently, detecting a link selection event in which a first user selects a link, as hosted on an originator web site of the first originator entity, to access the target web site;

in response to the link selection event, programmatically causing the first user to be charged the first monetary amount and the target entity to be charged the second monetary amount; and programmatically causing the first originator entity to be paid the third monetary amount for originating the link selection event;

said method performed by a networked computer system;

wherein the method further comprises transmitting, for presentation to the target entity, a web form for supplying the linking campaign information, said web form including fields for specifying at least said first and second monetary amounts.

25. The method of claim 24, wherein the networked computer system is operated by a service provider entity that is separate from the first originator entity and the target entity, and is separate from computer systems that host the target web site and the originator web site.

26. The method of claim 25, wherein the method further comprises the networked computer system serving the link over a computer network to a web browser of the first user.

27. The method of claim 24, wherein the first monetary amount and the second monetary amount are each less than one cent.

28. The method of claim 24, further comprising, in response to the link selection event, causing a web browser of the first user to be redirected to the target web site.

29. A network-based computer system, comprising:

a first user interface that provides functionality for a target entity that operates a target web site to submit, over a computer network, linking campaign information for establishing linking arrangements in which an originator entity hosts, on an originator web site, one or more links for accessing the target web site, wherein the linking campaign information specifies how much users are to be charged for selecting such a link, and specifies how resulting transaction fee revenue is to be divided between at least the originator entity and the target entity, said first user interface additionally enabling the target user to specify how a division of transaction fee revenue between the originator entity and the target entity is to change over time;

a first electronic data repository that stores linking campaign information submitted via the first user interface for each of a plurality of linking campaigns, at least some of which correspond to different target entities and target web sites than others;

a second user interface that provides functionality for originator entities to browse at least some of the linking campaign information associated with each of the plurality of linking campaigns, and to select particular linking campaigns in which to participate;

a second electronic data repository that records linking campaign participation selections of each of a plurality of originator entities, as made via the second user interface; and a transaction processor that, in accordance with the linking campaign information stored in the first data repository and the participation selections recorded in the second data repository, causes users to be charged for link selection events, and causes associated transaction fee revenue to be divided between the associated originator and target entities.

* * * * *